United States Patent [19]

Wells et al.

[11] 4,105,319

[45] Aug. 8, 1978

[54] MICROFICHE CARRIER

[75] Inventors: Thomas R. Wells, Des Plaines; Robert L. Kearney, Northbrook, both of Ill.

[73] Assignee: Bell & Howell Company, Chicago, Ill.

[21] Appl. No.: 700,284

[22] Filed: Jun. 28, 1976

Related U.S. Application Data

[63] Continuation-in-part of Ser. No. 532,798, Dec. 16, 1974, Pat. No. 4,006,980.

[51] Int. Cl.$^2$ ........................ G03B 21/00; G03B 23/12

[52] U.S. Cl. ........................................ 353/120; 40/363

[58] Field of Search ................... 353/118, 120, 25, 26, 353/27; 206/215, 425, 449; 40/159, 106.1

[56] References Cited

U.S. PATENT DOCUMENTS

| | | | |
|---|---|---|---|
| 3,153,870 | 10/1964 | Carlton | 353/25 |
| 3,293,786 | 12/1966 | Anderson | 40/159 |
| 3,324,918 | 6/1967 | Miller | 206/425 |
| 3,797,925 | 3/1974 | Smitzer | 353/27 |
| 3,844,649 | 10/1974 | Walter et al. | 353/120 |
| 3,973,344 | 8/1976 | Frankel | 40/158 B |
| 3,974,582 | 8/1976 | Jantzen, Jr. | 40/106.1 |
| 3,980,402 | 9/1976 | Holliday | 353/27 |
| 3,997,256 | 12/1976 | Wells | 353/27 A |

*Primary Examiner*—Samuel W. Engle
*Assistant Examiner*—Ralph Palo
*Attorney, Agent, or Firm*—Alan B. Samlan; Harry G. Thibault

[57] ABSTRACT

A plastic microfiche carrier has a central clearance for enabling an insertion of a replaceable microfiche film in the carrier. The corners of the carrier are tapered to facilitate an alignment of the carrier, and therefore the microfiche in a library file housed within the cartridge. The front or leading edge of the carrier is concave in the width dimension with a bullet-like nose double taper in the thickness dimension to guide and direct the microfiche, as it slips into and out of the library file.

21 Claims, 18 Drawing Figures

MICROFICHE CARRIER

This is a continuation-in-part of a copending application Ser. No. 532,798, filed Dec. 6, 1974 now U.S. Pat. No. 4,006,980.

This invention relates to microfiche carriers, especially to carriers used in readers for automatically selecting and projecting images photocopied on microfiche, and particularly — although not exclusively — to carriers which may be preloaded or preloadable into cartridges which may, in turn, be inserted into the reader.

Microfiche film is a known form of graphic data presentation wherein a number of pages or images are photographically reproduced on a single flat "card" of microfiche film (such as a card of 3 × 5 inches to 4 × 6 inches, for example). Any suitable number of pages (up to, say, a thousand or so) may be photographically formed in an orthogonal array on a single microfiche "card" of photographic film. The microfiche film may then be placed in an optical reader and moved over a rectilinear path until an image of a selected page is in an optical projection path leading to a display screen.

It is uneconomical to have a microfiche reader system for a single microfiche card; therefore, the user is likely to have an entire library file including many microfiche which must be kept in a specific order for quick recall. Therefore, it should be apparent that use of microfiche involves filing and storing in a library file, removal from the file, mechanical manipulation of the microfiche, and then refiling in the library file. Each microfiche must be found in the library file with little or almost no search, and then returned to the same spot in the library file to maintain the integrity of the library.

The mechanical manipulation of a microfiche involves sliding the microfiche into and out of the library file. Then, it must be placed in a mechanical transport mechanism in the reader. Next, the transport must be moved over a path in X and Y directions, until the selected image in the orthogonal array is in the optical path of a projector. Thereafter, the microfiche is removed from the reader and returned to the library file.

Human efforts lead to further problems. If manually kept, the microfiche library file is thumbed and soon becomes dog eared. Any grease or oil on the fingers cloud the film and reduces the quality of the reproduced image. Human error may lead to misfiling and an effective loss of the microfiche. The manipulation of the microfiche within the reader could cause scratches on the film.

To avoid these and other problems, it is possible to maintain the library file of microfiche in individual carriers which fit into cartridges. Therefore, only the cartridges need be touched by the operator. The mechanical microfiche reader equipment may be designed to manipulate the cartridge, to find and extract the desired microfiche carrier, and, after use, to return the carrier to its proper library file location within the cartridge. The combination of the carrier, cartridge, and reader includes means for finding and extracting one microfiche carrier from the library file and then reinserting it between many other microfiche carriers also filed in the cartridge. The problem is to find and select the desired one of the many carriers in the library file, to extract it without damage, to find and project the selected image, to find the spot in the library file for proper reinsertion of the carrier within the cartridge, to reinsert it without damage, and to safely retain the entire library file during storage, without danger of them falling from the cartridge.

The physical problems of extracting and reinserting the microfiche carriers require a guidance mechanism whereby the carriers slide smoothly by and between each other without mutually interfering with each other. In greater detail, a microfiche carrier is a relatively long and wide structure as compared to its thickness. For example, an exemplary carrier might be 5 × 6.5 inches and only one-sixteenth of an inch thick. Therefore, it tends to sag or bow in the middle. Sometimes adjacent carriers tend to catch each other and cross thread when one is reinserted into the cartridge. Hence, the guidance mechanism is designed to insure proper centering and aligning of the carrier at a time when it is inserted into the cartridge.

Accordingly, an object of the invention is to provide new and improved microfiche carriers which overcome the aforementioned problems. Here, an object is to provide carriers which are mechanically strong and dimensionally stable to withstand manipulation in a cartridge. In particular, an object is to provide a reusable microfiche carrier which enables easy removal and replacement of microfiche.

Another object of the invention is to provide a form of microfiche carrier which is contoured to guide and direct the carrier as it moves into position between other carriers. Here, an object is to prevent the leading edge of the carrier from interfering with other carriers in a cartridge.

In keeping with an aspect of the invention, these and other objects are accomplished by providing a plastic carrier, made with a central clearance or window area for enabling an insertion of a friction-held microfiche film into the carrier. In some embodiments, a clear envelope or a plurality of sheets of transparent material are incorporated in the plastic frame to protect the microfiche. The corners of the carrier are tapered to facilitate an alignment of the microfiche file within the cartridge. The leading and trailing edges of the carrier are contoured in the thickness dimension to be a double tapered wedge for guiding and directing itself between adjacent carriers as it moves into position within the cartridge. The carrier is also concave in the width dimension to enable the microfiche carriers to be inserted into the cartridge and withdrawn from the cartridge without tending to cross thread other carriers.

The nature of the invention may be understood best from a study of the attached drawing wherein.

Figure 3:
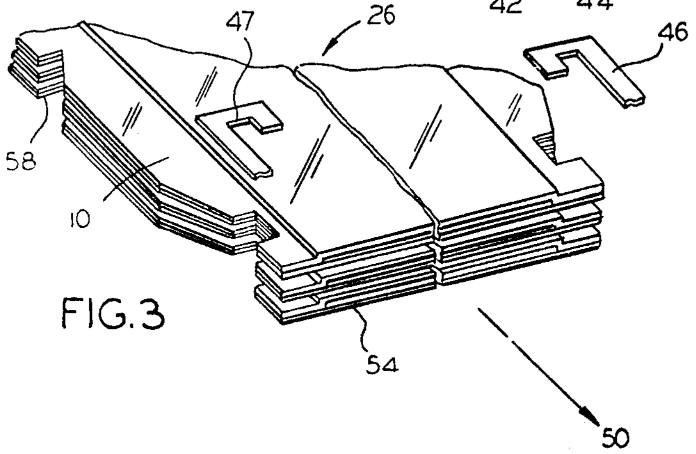
Figure 4:
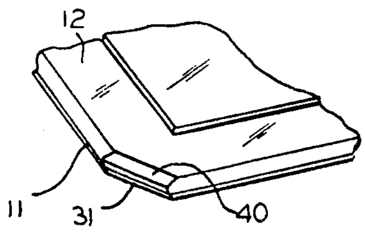
Figure 5:
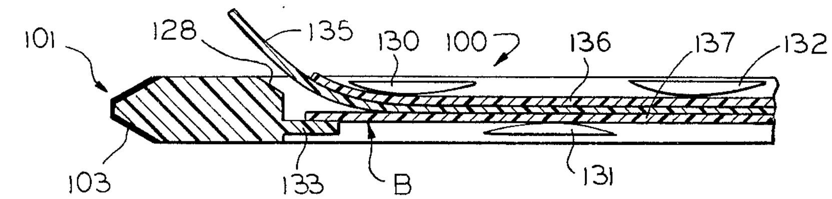
Figure 6:
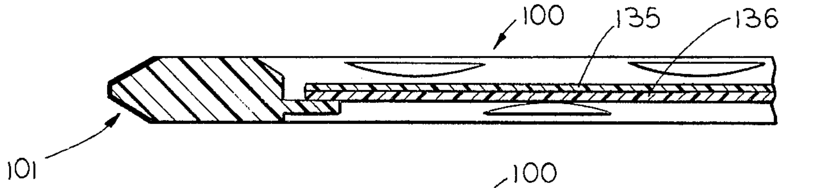
Figure 7:
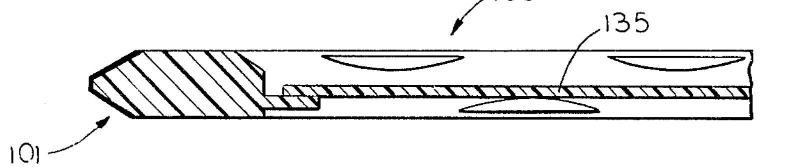
Figure 8:
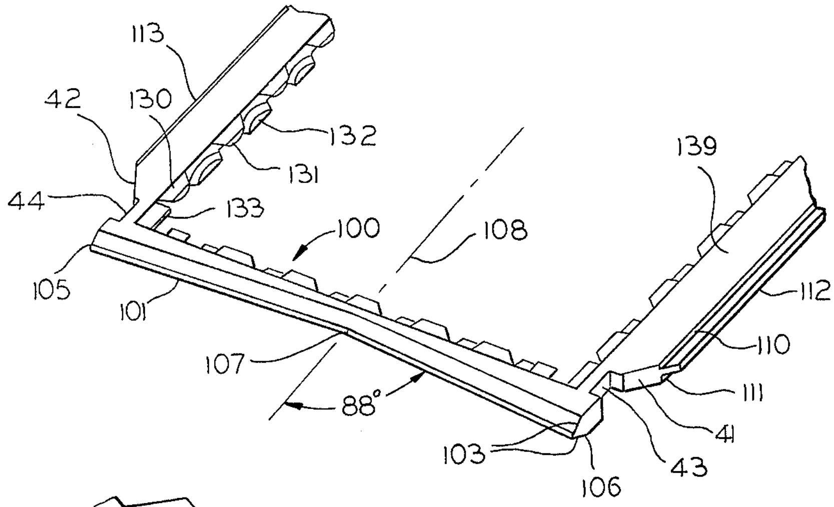
Figure 9:
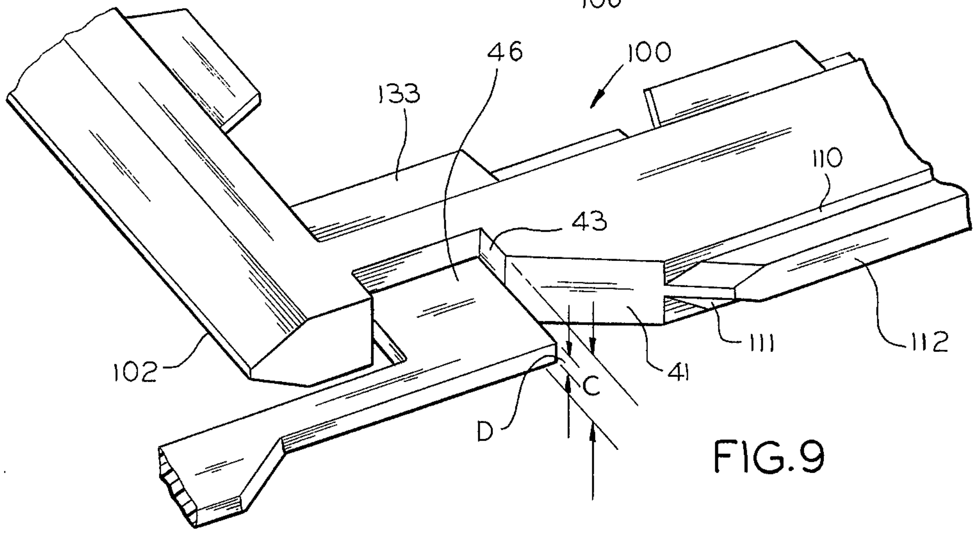
Figure 10:
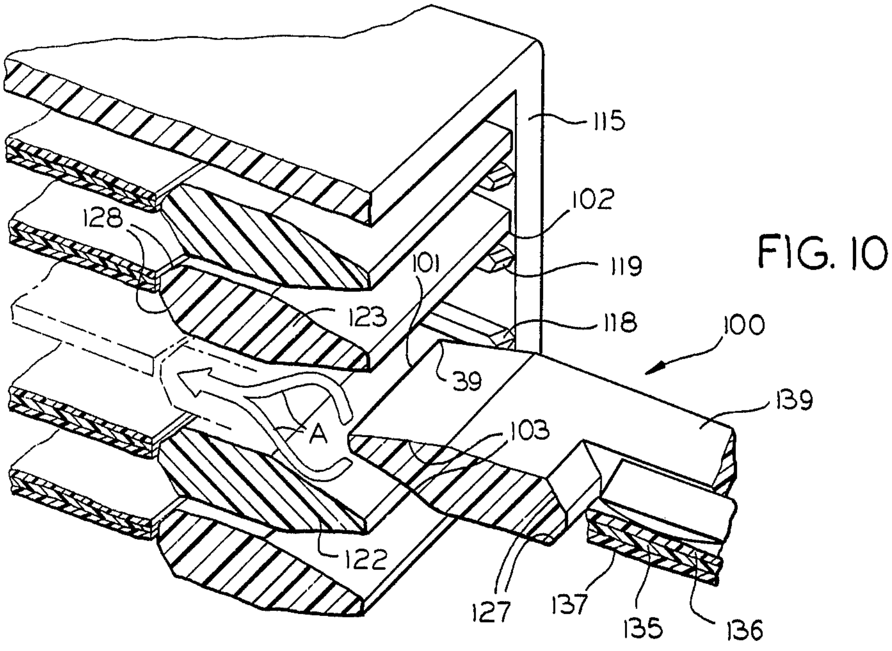
Figure 11:
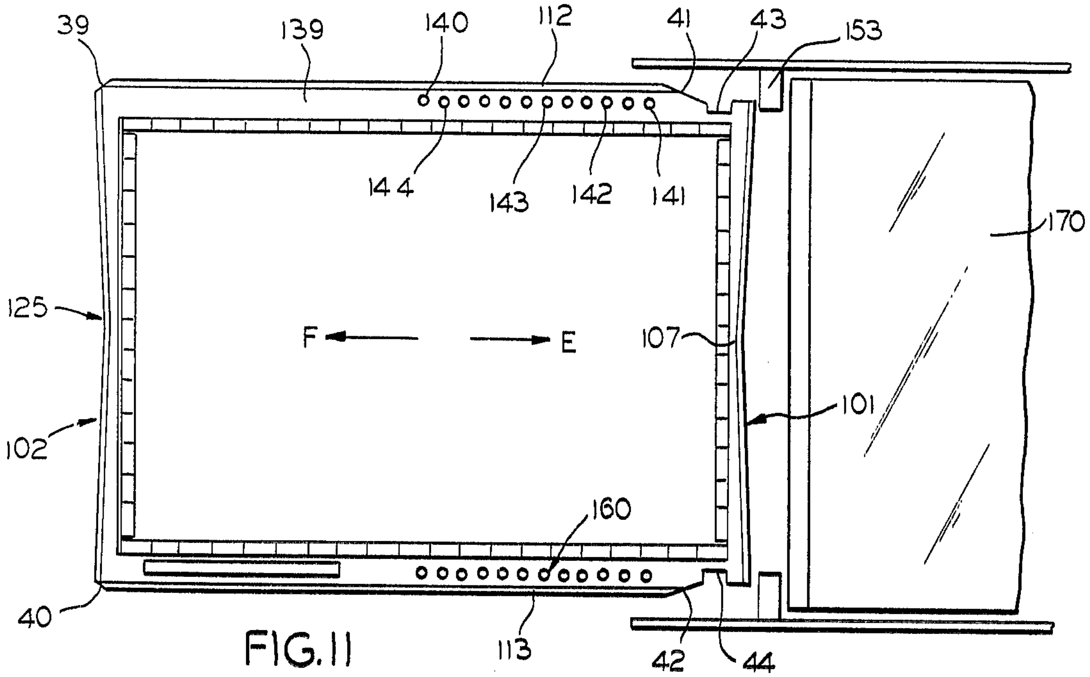
Figure 12:
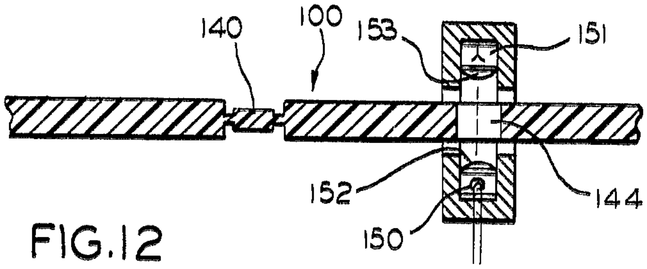
Figure 13:
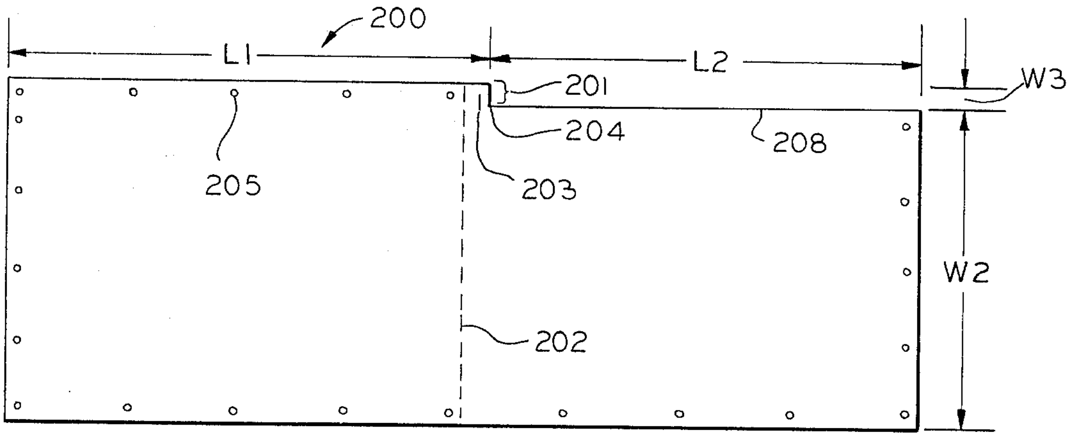
Figure 14:
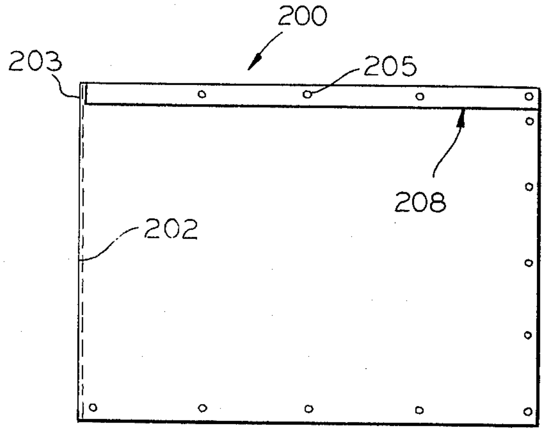
Figure 15:
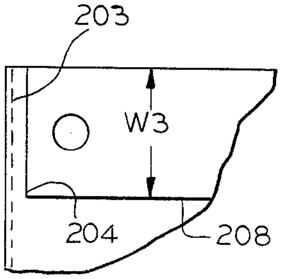
Figure 17:
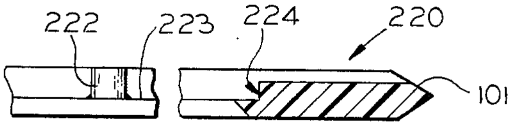
Figure 16:
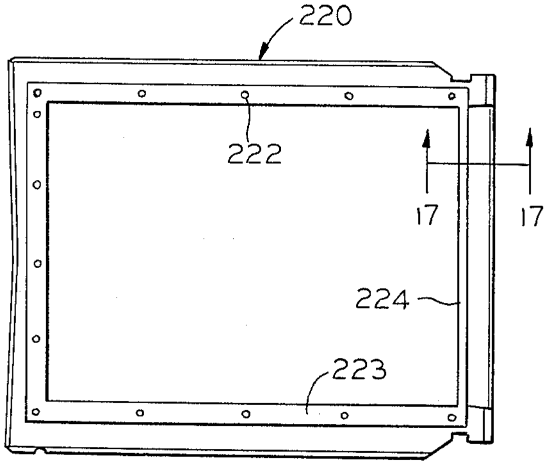
Figure 18:
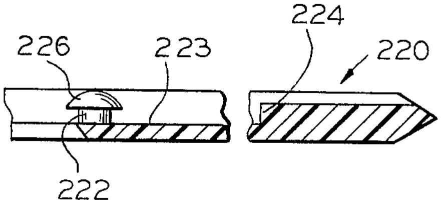

FIG. 3 schematically represents a library file of microfiche carriers located inside a cartridge;

FIG. 4 is a detail view of one tapered corner of the first embodiment of the microfiche carrier;

FIGS. 5–7 are three cross-sectional views of a second embodiment of a microfiche carrier, which illustrates how the leading edge of the carrier is shaped to form a wedge for guiding and directing it upon its insertion into a cartridge;

FIG. 8 is a perspective view of the front segment of the carrier showing how the leading edge is made concave to preclude a cross threading type of interference with adjacent microfiche;

FIG. 9 is a corner detail, in perspective, showing how a hook may be used to extract or to return a carrier;

FIG. 10 illustrates how the wedging action may assist the insertion and removal of a microfiche;

FIG. 11 is a plan view which shows how an identification may be placed upon a carrier;

FIG. 12 schematically illustrates how the identification may be read by an optical code sensor;

FIG. 13 is a plan view of a blank cut from a clear sheet of transparent material, which may be formed into an envelope for holding a microfiche;

FIG. 14 is a plan view of the blank of FIG. 13 after it has been heat folded to form a microfiche receiving envelope;

FIG. 15 is an enlarged, plan view, fragment of the corner of the envelope as seen in FIG. 14, showing how a double ply leading edge is formed;

FIG. 16 is a plan view of the preferably plastic microfiche carrier, similar to the plan view of FIG. 11, modified to receive the envelope of FIG. 14;

FIG. 17 is a fragmentary cross sectional view of the carrier, taken along the line 17—17 of FIG. 16 and showing how the carrier is initially formed to receive the microfiche envelope of FIG. 14; and FIG. 18 is a similar cross sectional view showing how the carrier is subsequently formed to capture and hold the envelope of FIG. 14.

In greater detail, the carrier 10 comprises two, initially separate sheets 11, 12 of clear plastic, which may be any suitable transparent film. The plastic should be strong and dimensionally stable. These two sheets may be cemented or otherwise adhered together with a suitable adhesive or other joining means above their sides and in a face-to-face relationship, to form an envelope which is open on one end.

Figure 2:
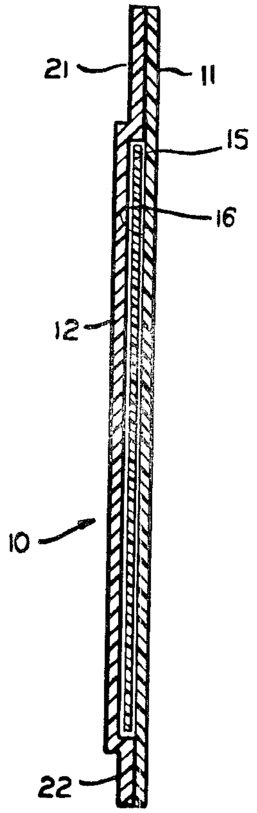
FIG. 2 is an edge view of the carrier taken along line 2—2 in FIG. 1.

Prior to assembly, one of the transparent carrier films 12 is embossed on three sides in a window area 13, 14 which substantially corresponds to the height and length of a microfiche film 15. As a result, the microfiche 15 slips into a clearance space 16 formed by the embossment (FIG. 2), where it is held by friction. The combination of the friction qualities of the plastic sheets forming the carrier 10, and the dimensions of space 16 permit the carrier to hold microfiche 15 in the space with enough frictional force to prevent its movement within the carrier, or its accidental removal from the carrier. Thereafter, each image, such as 17 (which may be a photocopy of a book page) may be viewed through the two plastic sheets forming carrier 10.

A recess or thumb space 20 is formed on the open end of the envelope so that the microfiche 15 may be gripped and pulled from the envelope. The remaining three sides of the envelope are sealed to complete the carrier 10. The parts of the embossment, which are outlined in heavy ink (FIG. 2), may be thought of as an L-beam which tends to strengthen and give dimensional stability to the carrier. Also, the somewhat depressed areas 21, 22 provide a clearance which enables the microfiche carrier 10 to slide more efficiently in a cartridge, and without binding at the edges.

The cartridge (FIG. 10) into which a carrier is inserted includes small spaced, parallel guides or shelves along the opposed internal edges so that a space is maintained between two adjacent microfiche carriers after the microfiche carrier 10 is extracted. This way, the microfiche carrier 10 has a space which it may enter when it is returned to the file.

Figure 1:
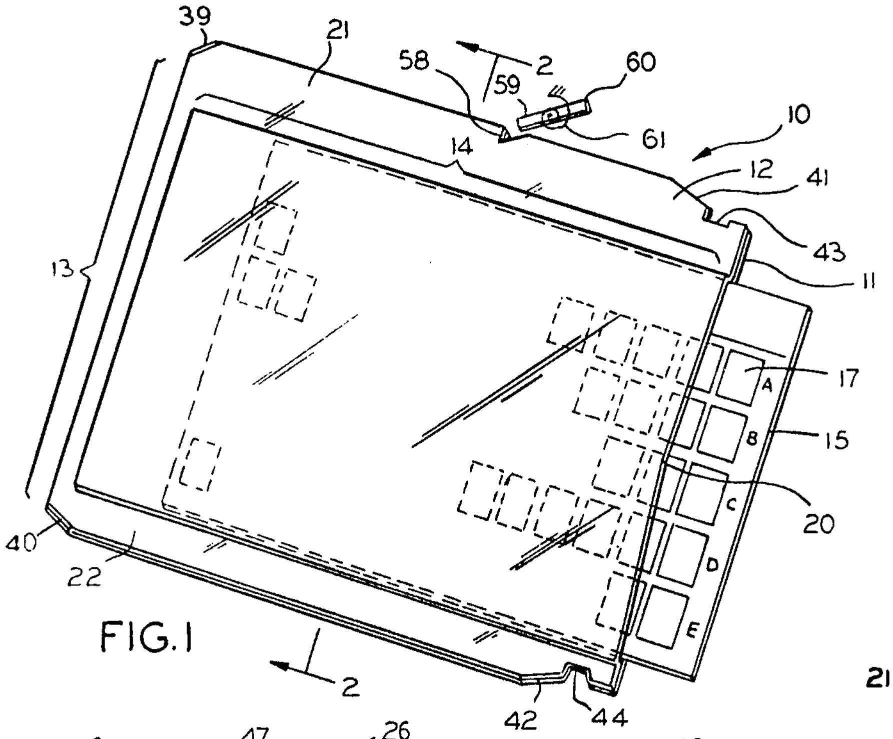
FIG. 1 is a perspective view of a first embodiment of the inventive microfiche carrier, which is a completely transparent envelope with a microfiche film inserted therein.

The end of corner of the leading edge of microfiche carrier 10, which first enters the cartridge, are tapered at 39, 40 (FIGS. 1, 4). Hence, the carriers align themselves within the cartridge by engaging internal cartridge walls having a mating taper at the back of the cartridge.

The top and bottom corners 39, 40 (as viewed in FIG. 1) of each of the two carrier films 11, 12 are beveled in an opposite direction so that V-notches 31 (FIG. 4) are formed therein when the two transparent film sheets 11, 12 are cemented together.

The opposite or trailing end of the microfiche carrier 10 which is the end adapted to first leave the cartridge, is tapered at 41, 42 and notched at 43, 44 (FIG. 1). An extractor arm 46, 47 (FIG. 3) comprises hooks which engage the notches 43, 44 to grip and extract a selected one of the microfiche in the library file 26. Thus, for example, hooks 46, 47 may be lowered in notches 43, 44 where they will extract microfiche 10 from the library file 26. Tapered portions 41, 42 permit the carrier 10 to readily slide between two glass flats forming part of the reader shown in FIG. 11.

Each microfiche carrier has a notch 58 formed along one edge thereof (FIG. 1). One or more spring loaded latches (such as 59) is built into the cartridge to engage the notch 58 and releasably keep the microfiche firmly in the cartridge. The spring is numbered 61. When the cartridge is inserted into a microfiche reader, the arm 60 swings in a clockwise direction and latch 59 is swung to release the microfiche library file and enable an extraction of the selected microfiche carrier.

Briefly, each microfiche carrier 10 slips into a cartridge and rests between adjacent shelves or guides which hold the library file microfiche in a spaced parallel relationship. There is no rubbing of one carrier against another since the shelves in the cartridge hold the microfiche carriers apart. The embossed window area 13, 14 receives the microfiche film 15, which may be replaced quickly and easily. At 21, 22, the other side of the embossment provides a nonbinding edge in the thickness dimension. End tapers and notches enable carrier alignment, extractor hook engagement, and microfiche latching. The microfiche carriers are reusable for updating the library in the cartridge.

The nature of a new and improved carrier is seen in FIGS. 5–11. In general, this carrier is a plastic frame 100 having a window region conforming to the length and width of a microfiche film. In an exemplary carrier the window is about 4 × 6 inches, the external carrier dimensions are about 5 × 6.5 inches, and the frame is about one-sixteenth of an inch thick.

The "leading edge" 101 of the carrier is the one which first enters a cartridge (FIG. 10) when a carrier is inserted therein. The "trailing edge" 102 is the one which leaves the cartridge first.

In its vertical or thickness dimension, both the leading and the trailing edges are a double tapered wedge which flairs from the center of the vertical edge backwardly and outwardly to the upper and lower surfaces of the carrier. By way of easy identification, this double tapered wedge is outlined in heavily inked lines 103 in FIGS. 5–7. The double taper should be apparent from an inspection of the other figures.

Both the leading and the trailing edges 101, 102 have a generally concave contour in the width dimension, which project from the opposed outward corners toward the center of the frame. More particularly, as best seen in FIG. 8, the leading edge 101 extends along a width dimension and comprises two relatively straight lines which taper from outside corners 105, 106 toward the center 107. The taper angle is 88° with respect to the center line 108 or the side rails of the carrier. By an inspection of FIG. 11, it is seen that the trailing edge is also concave and that the edge lines are also set at the same general angle of 88°.

The corners 39–42 of the carrier frame have the same tapers and notches 43, 44 that were described above in connection with the embodiment of FIGS. 1–4. The extractor hook 46 is seen in FIG. 9 as engaging the notch 43. It should be understood that the general mechanism for inserting and removing the carriers is the same for all of the embodiments.

The two side rails of the frame have relieved areas 110, 111 which form relatively thin portions 112, 113 that enable the carrier to slide freely, without binding.

As best seen in FIG. 10, the cartridge 115 includes a number of internal, horizontally opposed, spaced, parallel shelf-like edge members 118, 119 which form the supports for the carriers. By way of example, the thin carrier edge 112 slides between shelves 118, 119, as seen in FIG. 10. At the point shown in FIG. 10, the bullet-like nose 101 of the double tapered leading edge is about to enter the space between adjacent carriers 122, 123. The dimensions are such that carrier 100 should not touch the two adjacent carriers 122, 123. However, the carriers may warp, sag, or otherwise become distorted so that they brush against each other. There will be no adverse effect from this since, as indicated by the arrow A, the upper and lower surfaces 103 of the double taper wedge, at the corner 39, will behave as two cams tending to spread apart the carriers 122, 123. At the opposite corner 40 (FIG. 11), a similar bullet-like nose will also tend to spread the carriers 122, 123.

If the carriers have sagged or warped, the most pronounced effect will likely be at the locations most remote from the edge shelf supports such as 118, 119 (i.e., at the center 125 (FIG. 11), on the leading edge of the carrier 100 being inserted (FIG. 10) and at the centers of the carriers 122, 123 already in place in the cartridge. From an inspection of FIG. 11, it should be apparent that the adjacent carriers first meet at the corners (39, 40 for the carrier being inserted and 41, 42 for the carriers already in place). The edges sloping from these corners to the centers 101, 102, act as guides for directing the leading edge of the carrier as it is being inserted between the trailing edges of the carriers which are already in place. Thus, any carrier with a sag or warpage is gently lifted or otherwise moved by the camming action of the bullet-like nose of the double taper wedge.

It should be apparent that there is a similar double taper wedge at the inside edge of the window of the frame, as seen at 127, 128 in FIG. 10. Therefore, it should also be apparent that there is a similar bullet-like, double taper which first engages at the center points 125, 101 of the leading and trailing edge on extraction. Therefore, there can be no interlocking at the inside edges of sagging, warped, or misaligned carriers when the microfiche is extracted.

The nature of a first form of a microfiche film support is seen in FIGS. 5–8. The internal taper of wedge 128 also serves as a guide for insertion of a microfiche film. In greater detail, a series of upper and lower embossments 130–132 are formed along each internal edge on the microfiche carrier. A tab-like member 133 is formed near the front edge of the carrier to guide and direct a microfiche film 135 and transparent cover sheets 136, 137. Each of the embossments 130–132 has a rounded surface bowed toward the center line of the carrier, also to guide and direct the film and cover sheets.

Accordingly, if a film 135 or cover sheet 136, 137 is slid over the surface 128 and against the tab 133, it will be deflected toward the embossments 130–132. The curved surfaces of the embossments bow inwardly toward the center line so that the film 135 and cover sheets 136, 137 are guided along the center line and into a seated position.

To remove a microfiche from a carrier, an upward pressure B is applied upon the film 135 or cover sheet 137 near the tab 133, to lift it above the inclined surface 128. Then, the film and cover sheets may be slipped out of the carrier.

FIG. 5 shows an exemplary usage wherein the microfiche is held between upper and lower transparent cover sheets 136, 137, which may be Mylar material. In FIG. 6, there is only one cover sheet 136, in addition to the microfiche film. In FIG. 7, the film 135 is self-supporting with no cover sheets.

FIG. 9 illustrates an advantage of the embodiments of FIGS. 5–18. The carrier 100 may be relatively thick, as seen at C, compared to the thickness D of the extractor hook 46. This way, the tolerance of the extractor hook position may be increased substantially.

Microfiche identifying encoding means is provided on the embodiments of FIGS. 5–18, as seen in FIGS. 11, 12. Here, the side rails 139 of the microfiche frame have a number of weakened areas molded therein, one of which is seen at 140. Since the frame in its originally molded condition is unbroken, light cannot be transmitted therethrough. However, each weakened area includes a plug which is adapted to be pressed out of the frame by a suitable stylus or other sharp instrument. This way, an encoded series of light transmitting holes may be formed in the frame. For example, if each of the holes 141–144 is punched, the frame shown in FIG. 11 is identified by the binary word 101001000010, when the carrier travels in the direction E.

A code reader is seen in FIG. 12 as including a light bulb 150 positioned to cast light upon a photo cell 151. If desired, a pair of lens 152, 153 may be provided to focus the light. The side rail 139 of the carrier moves through a space between the light bulb 150 and photocell 151. Therefore, light passes from the bulb 150 through any hole formed in the carrier to the photocell 151, thereby giving an electrical signal, and does not so pass at any other time. Accordingly, as the specific microfiche of FIG. 11 is extracted (moved in direction E), a signal is detected when each of holes 141–144 passes through the optical sensor 150–153. Thus, when the carrier is extracted and moves in direction E, the resulting electrical signals are the binary word 101001000010. Obviously, an inverted binary word is read out when the microfiche is moved in direction F to reinsert it into the cartridge. It is easy to reinvert such a binary word by electronic logic circuitry. For example, each signal read out responsive to movement in direction F may be inserted into a shift register, and then the shift register outputs may be scanned and read out in an inverse order.

As indicated at 160, more encoded information may be stored on any other part of the frame. Therefore, there is a capacity on the microfiche carrier frame for providing substantial amounts of information. This information may serve any of many purposes. For example, it may identify a microfiche, indicate the degree of magnification required, identify a particular location in a library file or on a microfiche. Any suitable form of control circuitry may be used to operate the microfiche reader responsive to this encoded information.

The microfiche reader is not shown in detail in the drawings. However, it is suggested by a pair of glass plates 170 which have a suitable space therebetween. As the microfiche carrier 100 is pulled in direction E, it is slid between the glass plates 170. During such sliding motion the bullet-like, double tapered trailing edge 101 guides and directs the microfiche so that it moves smoothly between the glass plates 170.

Still another embodiment of the inventive microfiche carrier is seen in FIGS. 13–18. Briefly, this embodiment uses a plastic carrier (FIGS 16–18) somewhat similar to the carrier of the embodiment of FIGS. 5–12, plus a transparent envelope (FIGS. 13–15) somewhat similar to the envelope of the embodiment of FIGS. 1–4. Here, however, the transparent envelope is permanently attached to the plastic carrier and the individual microfiche are slid into or out of a side opening in the envelope.

In greater detail, the transparent envelope (FIGS. 13–15) begins as a blank 200 (FIG. 13) which is die cut from a sheet, preferably "Mylar" type D polyester, 0.005 inch thick. The blank has a greater width W1 at one end, as compared to the width W2 at the other end. On one side of the blank, the width reduction W3 provides a clearance space 201 for enabling stakes to be used to attach the transparent envelope to the plastic carrier without denying access to the interior of the envelope. The length L1 of the wide part of the blank is slightly greater than the length L2 of the narrow part of that same blank. Therefore, if the blank is heat folded back upon itself at a center line 202, there will be a small tab 203 (FIGS. 13, 15) which folds over to give a strong and double ply thickness at the leading edge. The material must not tear in the corner 204 formed by tab 203 and the top of the blank. The heat fold should be such that the "Mylar" sheet lays back upon itself, with no more than a 0.006 inch bow.

After the die cut blank is formed into a folded envelope (FIG. 14), it is perforated around the three open edges to form a number of stake holes, one of which is numbered 205. By inspection, it should be apparent that the perforations are not formed along the closed or folded side 202 of the envelope.

The envelope edge 208 is spaced below the stake holes (and their associated fasteners), by virtue of the width reduction distance 201, thereby forming a side opening for the envelope. This way a microfiche may be slipped into or out of the envelope by passing under the edge 208.

The plastic carrier 220 is essentially similar to the plastic carrier of FIGS. 5–12, except that the embossments or tabs 131–133 are not provided. Instead, a plurality of upstanding stakes (one of which is numbered 222) are formed on a ledge 223 extending around the periphery of the window area in the plastic carrier 220. Each stake is accurately located to receive a corresponding one of the perforations in the transparent envelope. For example, hole 205 fits over stake 222. Therefore, the envelope 200 may be laid upon the ledge 223 with a stake projecting upwardly through each of the perforations. After a moment's reflection, it should be apparent that the stakes secure the three open edges (i.e., all except folded edge 202) of the envelope 200 in place upon carrier 200. The folded edge 202 simply lays on the ledge at the end 224 of the carrier 220.

The carrier 220 is made of a deformable plastic material which may be shaped, especially under heat or pressure. In greater detail, when the carrier 220 is originally molded, each stake is a simple, upstanding cylindrical shape, as shown at 222 in FIG. 17. After the folded envelope 200 is fitted over the stakes, heat or pressure is applied to the top of each stake. Therefore, the stake mushrooms, as seen at 226, to capture and hold the envelope 200. After this plastic forming step is completed, the envelope is securely attached to the plastic carrier on each of three sides. Nevertheless, the microfiche may still be inserted under edge 208 and into the envelope.

One of the advantages of this construction should be apparent from an inspection of FIGS. 17 and 18. The ledge 224 has both horizontal and vertical components or walls, as viewed in FIGS. 17, 18. The horizontal wall component serves as a backing frame which cooperates with the mushroomed top 226 and thereby holds the transparent envelope which is made from blank 200. The vertical wall component provides a mechanical stop which inhibits, and tends to provent the microfiche from slipping from under the edge 208 and falling out of the envelope. Thus, the microfiche will not be dislodged if the carrier is shaken or dropped. Of course, it is still easy to deliberately remove the microfiche by guiding it over the vertical wall component.

Those who are skilled in the art will readily perceive various modifications which fall within the scope and the spirit of the invention. Therefore, the appended claims are to be construed to cover all equivalent structures.

What is claimed is:

1. A microfiche film carrier for use in a library file which supports a plurality of microfiche carriers in a spaced parallel side-by-side relationship, said carrier comprising: frame means having therein a window area with dimensions substantially corresponding to dimensions of a microfiche film, said carrier frame having opposed leading and trailing edges and side rails for supporting said microfiche when in a library file, means for mounting at least a microfiche film within said window area, the edges of said side rails forming areas to support said microfiche without thickness binding between said carrier and its adjacent supporting structure in a library file, and a concave contour means formed in the width dimension of said carrier on at least one of said leading and trailing edges for guiding and directing said carrier as it is inserted into or extracted from a library file.

2. The carrier of claim 1 and encoding means on said carrier for identifying the microfiche in said carrier.

3. The carrier of claim 1 wherein said means formed on at least one edge further comprises a bullet-like nose double taper wedge in the thickness dimension of said carrier.

4. The carrier of claim 3 wherein said concave contour comprises two relatively straight lines which taper from outside corners of said carrier to the center of said carrier midway between said side rails, said taper being an angle of approximately 88° with respect to said side rails.

5. The carrier of claim 4 wherein said means formed on at least one edge comprises a double taper wedge formed in a thickness dimension on the window side of at least one of said leading and trailing edges, for guiding and directing said carrier as it is inserted into or extracted from a library file.

6. The carrier of claim 5 wherein said guiding and directing means are formed on both said leading and said trailing edges of said carrier.

7. The carrier of claim 1 wherein said means formed on at least one edge further comprises a bullet-like nose double taper wedge in the thickness dimension of said carrier.

8. The carrier of claim 8 wherein said means formed on at least one edge comprises a double taper wedge formed in a thickness dimension on the window side of at least one of said leading and trailing edges, for guiding and directing said carrier as it is maintained into or extracted from a library file.

9. The carrier of claim 1 and a ledge surrounding said window area, a plurality of upstanding stakes formed on said ledge and distributed along at least one side of said window area, a transparent envelope shaped and dimensioned to fit into said window area, and a plurality of perforations, formed in said envelope to fit over and be secured by individually associated ones of said stakes.

10. The carrier of claim 9 and an opening along one edge of said envelope for enabling a microfiche to be slipped into and out of said envelope.

11. The carrier of claim 10 wherein said ledge terminates in an upstanding wall at least in front of the opening along the edge of said envelope, whereby a microfiche is inhibited from accidentally falling out of said envelope.

12. The carrier of claim 9 wherein said stakes and perforations are distributed around three sides of said window area.

13. The carrier of claim 12 wherein said envelope comprises an elongated and generally rectangular blank made from a transparent plastic which heat folds substantially in half with said fold being generally perpendicular to said elongation, approximately one-half of said rectangular blank being wider than the other half, whereby an edge of the more narrow section provides a clearance area so that the stakes along that edge pass through only the wide half of the material.

14. The carrier of claim 13 wherein said wide half is slightly longer than said narrow half so that a double ply thickness is formed at the folded edge.

15. The carrier of claim 13 wherein the top of each of said stakes is deformed to mushroom over the individually associated perforation and capture said envelope.

16. The carrier of claim 15 wherein said ledge includes horizontal and vertical eomponents, said mushroom top on said stake captures said envelope between said top and said horizontal component and said vertical component provides a mechanical stop in front of said narrow half for inhibiting accidental dislodgement of a microfiche in said envelope.

17. A microfiche carrier comprising a frame having a window area in approximately the size and shape of a microfiche, a pair of spaced parallel transparent panels attached to said frame and covering said window area, and a slot opening along only one side of one of said panels for enabling a microfiche to slip into or out of the space between said panels and a wall formed on said frame in at least part of the area in front of said slot for inhibiting a accidental dislodgement of a microfiche in the space between the transparent panels.

18. The carrier of claim 17 wherein said frame, said window area, and said panels are generally rectangular, a plurality of perforations distributed along a plurality of sides of said rectangular panels, and mating fastener means formed on said frame for receiving said perforations and thereby fastening said panels to said frame.

19. The carrier of claim 18 wherein each of said fasteners is a stake formed on said frame and mushroomed over the associated perforation.

20. The carrier of claim 19 wherein said panels are made from one sheet of transparent plastic, folded in half, with substantially one half sufficiently more narrow on one side so that the stakes on that side pass through only one ply of said plastic.

21. The carrier of claim 20 wherein said narrow half terminates before said fold whereby said sheet of plastic is two ply thick across the entire width of the fold.

* * * * *